United States Patent [19]

Wirth et al.

[11] 4,015,678

[45] Apr. 5, 1977

[54] MASS AND FORCE METER WITH LEVELLING MEANS

[75] Inventors: Armin Wirth; Johannes Wirth, both of Zurich, Switzerland

[73] Assignee: Wirth, Gallo and Company, Switzerland

[22] Filed: Aug. 6, 1975

[21] Appl. No.: 602,423

[30] Foreign Application Priority Data

Nov. 14, 1974 Switzerland ............... 15297/74

[52] U.S. Cl. .................. 177/244; 177/126; 177/255; 248/188.3
[51] Int. Cl.² ............. G01G 21/28; G01G 21/12; F16M 13/00
[58] Field of Search .......... 177/126, 128, 255, 244; 248/180, 188.3

[56] References Cited

UNITED STATES PATENTS

| | | | |
|---|---|---|---|
| 1,538,493 | 5/1925 | Steedman | 177/255 X |
| 1,759,884 | 5/1930 | Bousfield | 177/244 X |
| 2,805,055 | 9/1957 | Swanson | 177/244 X |
| 2,835,484 | 5/1958 | Bradley | 177/255 X |
| 3,894,595 | 7/1975 | Czyryk | 177/255 X |
| 3,899,034 | 8/1975 | Polen et al. | 177/255 X |

Primary Examiner—George H. Miller, Jr.
Attorney, Agent, or Firm—Stevens, Davis, Miller & Mosher

[57] ABSTRACT

A mass and force meter employing levers to carry the load support which levers in turn are supported by a frame with four legs. Both frame and load support are constructed to deform under the weight of the apparatus itself, so the meter is in a statically defined position even if positioned onto an uneven floor or support structure.

8 Claims, 8 Drawing Figures

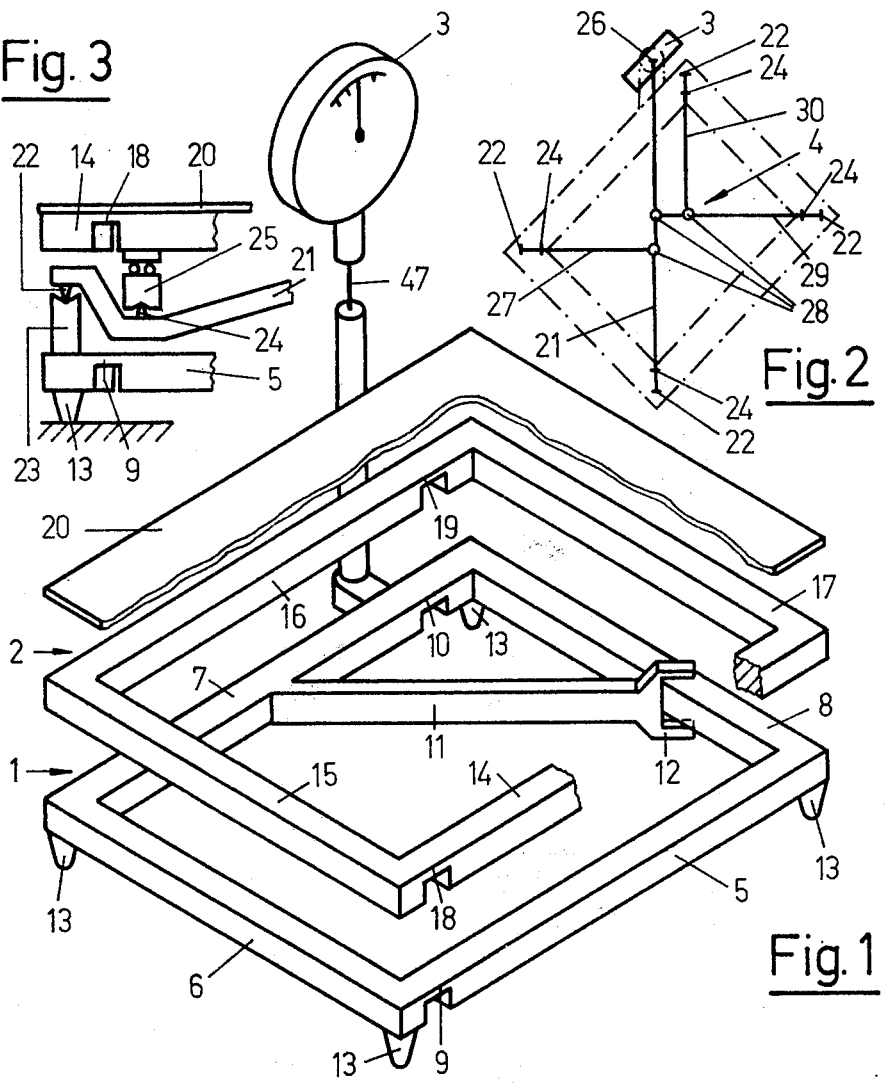
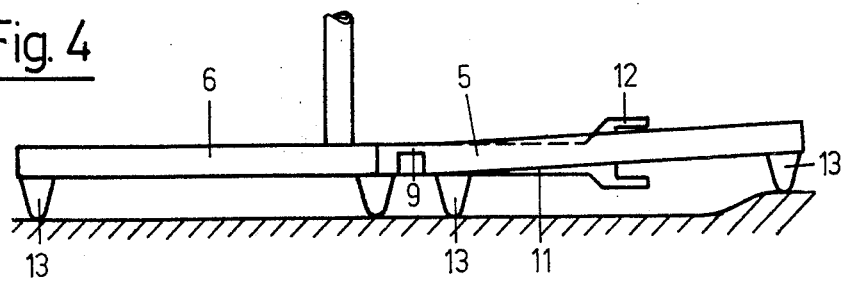

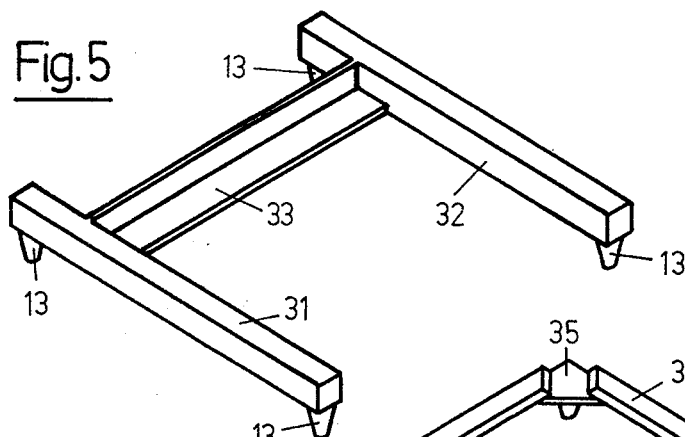
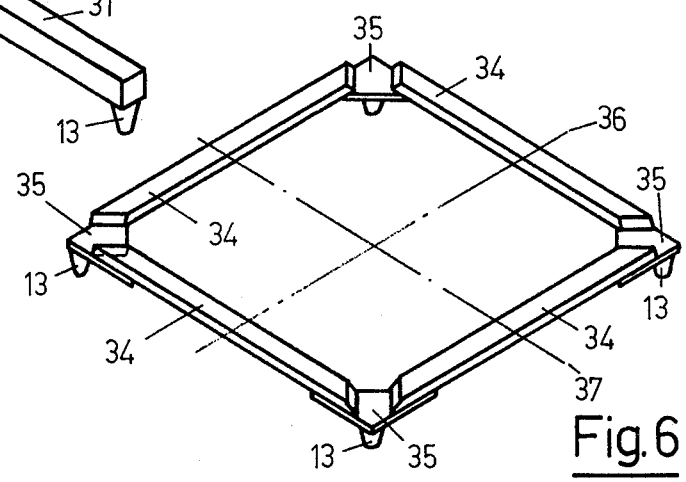
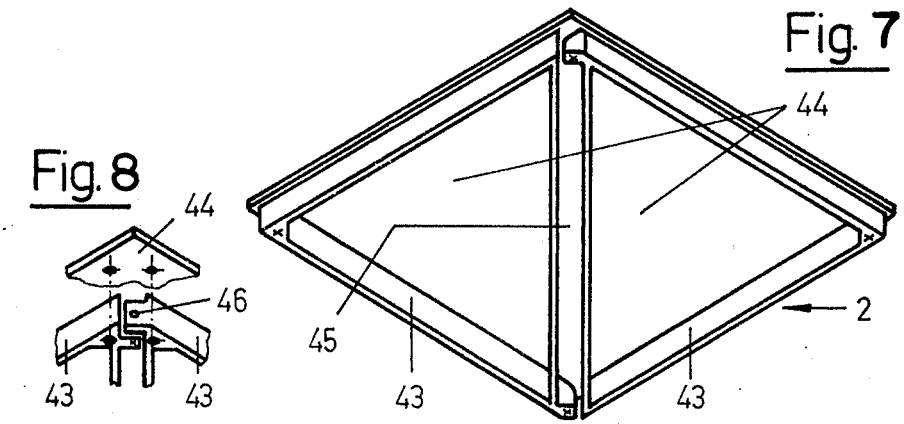

MASS AND FORCE METER WITH LEVELLING MEANS

The present invention relates to a mass and force meter with a four-sided frame provided with four legs, and a four-sided loadsupport resting upon this frame by means of four intermediary levers.

Such mass and force meters are frequently used as balances for loads from average up to heavy. In the case of balances of older design, usually a lever system transmitting the load acts upon a counterbalance device, e.g. on sliding weights. Later on, these have been replaced by inclination scales. Modern balances may present a lever system acting upon one single pressure cell.

There are many balances with a small maximum load in use, e.g. balances to be placed on a counter, whose frame has three legs. The own weight of the balance itself is proportionally so high compared to the maximum load, that even if the load is put near an edge of the load support, the resultant center of gravity remains sufficiently within the triangle formed by the three supporting legs or feet to prevent the load support or the balance from tilting.

In the case of balances with a high maximum load, especially balances of light construction, three feet are no more sufficient. If the load is put on eccentrically, in certain points of the load support, the balance may tilt. Such balances must be provided with four feet or four supporting points.

The main disadvantage of this solution consists in the fact that a statically indeterminate condition is created, i.e., that the force acting upon each foot is indeterminate. If the gound is not even enough relative to the natural twisting elasticity of the construction, e.g. If it presents an unevenness of more than 1-2 mm for a side length of 1 m, the frame stands only on three feet and the height of at least one foot has to be adjusted to prevent the balance from rocking.

Manufacturers have been trying to build balances which indicate correctly even at a slightly oblique position, e.g. up to 1/20. Such balances do not need leveling at every displacement from one table to another or when moved on an uneven ground. This is particularly important for frequently displaced balances, especially for movable ones. If such balances must have four feet, the important advantage of insensibility to an oblique position is lost, because after every displacement on an uneven ground they are rocking and adjusting means, e.g. adjusting screws, have to be set to stabilize the four feet.

The object of the invention is a mass and force meter with four feet which, by self-adaptation of these feet to the unevennesses of the ground, eliminates the described disadvantages. Another object of the invention is a mass and force meter comprising a four cornered frame with four sides, four legs each mounted under a corner of said frame, a four cornered load support with four sides, four supporting elements mounted between said load support and said frame, said sides of the frame and of the load support being pairwise swingable under the effect of the weight of the meter itself, around geometrical axes bisecting said sides, each pair of sides of the frame and of the load support respectively, being swingable in the sense opposite to the sense in which the other pair of sides of the frame and the load support respectively swings.

Embodiments of the invention are described below with reference to the accompanying drawings, wherein:

FIG. 1 shows a perspective view of a balance without a lever system,

FIG. 2 shows schematically the lever system of the balance of FIG. 1,

FIG. 3 shows a partial side view of the disposition of frame, load support and lever system, FIG. 4 shows a side view of the frame of the balance of FIG. 1, FIG. 5, 6 show each one a modification of the frame, FIGS. 7 and 8 each show a modification of the load support.

In FIG. 1, a balance is schematically represented in a perspective view. it is provided with a frame 1, a load support 2 and a load-compensating and displaying device 3. The latter could consist, for instance, in an inclination scale. The lever system 4 mounted between frame 1 and load support 2 is not represented in FIG. 1. It is described with reference to FIGS. 2 and 3.

The frame 1 is quadrangular and comprises four interconnected bars 5,6,7 and 8. Each of the bars 5 and 7 presents one bending link 9 and 10, which are disposed near two opposite corners of frame 1. An arm 11 is fixed on bar 7. It extends essentially orthogonally to the straight line connecting the two bending links 9,10. It has a bifurcated end 12 interacting, as described later, with bar 8. Each corner of frame 1 is provided with a foot 13. The load support 2 consists of the elements 14–19 corresponding to elements 5–10 of frame 1. Furthermore, a supporting plate 20 is fixed to the bars 14–17.

The lever system 4 is schematically represented in FIG. 2. It consists of four levers 21,27,29 and 30. The main lever 21, extends essentially diagonally over frame 1 and presents on one end a supporting edge 22 which rests upon a socket 23 (FIG. 3) of bar 5. Furthermore, it presents on the same end a load edge 24 which, with the interposition of a supporting organ 25, supports one end of bar 14 of the load support 2 (FIG. 3). On its other end the main lever 21 is provided with an end edge 26 interacting in a known way with a rod 47 of the load-compensating and display device 3. A second lever 27 is provided on its left end (FIG. 2) with another support edge 22 and a load edge 24. This left end is situated between the left ends of bars 6 and 15 (as seen in FIG. 1), the disposition being the same one as represented in FIG. 3. On its right end (as seen in FIG. 2) the lever 27 presents a coupling edge 28, by which it rests upon the main lever 21.

The right end of a third lever 29 is located between the right ends of bars 8 and 17, the disposition of the edges, socket and supporting organs also corresponding to FIG. 3. Its left end rests upon the main lever by means of a coupling edge 28. Finally a fourth lever 30 is provided, one end of which is located between bars 7 and 16 near notch 10 and whose second end rests upon lever 29 by means of a coupling edge 28. Also for this lever 30 the disposition is as in FIG. 3.

Instead of providing inclination weights 3 other systems could be applied. The final edge 26 could act upon a pressure cell with vibrating strings, a computing device and digital display. Also other known measuring systems could be applied.

For sake of simplicity, only frame1 is represented in FIG. 4. When the above described balance is positioned on an uneven ground, it adapts itself due to the described construction. A ground is considered as uneven when the parts of the ground under the four feet 13 are not situated in the same plane. If, for instance, foot 13 located under the right end of bar 5 rests higher than the other feet, the part of the frame composed of bars 5 and 8 swings accordingly around the straight line connecting the two bending links 9,10. Thus the whole frame 1 rests on its four feet 13 and the balance does not tilt. The design of the load support 2 and of the supporting organs 25 permits a transverse movement, so that the load support 2 rests upon the four supporting organs 25 and thus it does not tilt either.

The admitted size of the unevenness, e.g. a prominence or a depression of the ground under a foot is determined by the play of bar 8 in the bifurcated end 12 of arm 11. This self-adaptation of frame 1 to the unevenness is made possible by the fact that bars 5 and 8 swing round the straight line connecting the bending links 9,10 under the own weight of the whole balance. In both cases, prominence or depression under a foot, these movements of the feet 13 correspond to a pairwise rotating movement of the bars 5–8 around the axles bisecting the sides of frame 1. The pairs of bars 5,7 and 6,8, rotate in opposite sense around their common axle bisecting the sides. In other words, in presence of an unevenness, frame 1 is twisted under the effect of the weight of the balance itself. The load support works in the same way as the frame. The load plate 20 rests upon it. It has the task to take over the load wherever it is placed on the whole surface. Load plate 20 adapts to the deformation of the load support 2 by means of a bending strip extending essentially diagonal over the bending links 18,19. Load plate 20 is not rigidly, but somewhat elastically connected with the bars 14–17, in order to avoid increasing its rigidity by the compound effect of the load support 2 and the load plate 20. Instead of the bending links 9,10 and 18,19 others, e.g. pivot links can be used, which, similar to FIG. 8, form together an essentially diagonal axle.

The frame and the load support need not be identical. Frames and load supports of different construction may be combined, on the premises that they present the mentioned characteristics, i.e., the possibility to form a twisted frame or a twisted surface.

Another embodiment is represented in FIG. 5, which can be used both as a frame or as a load support. It consists of two bars 31,32 being connected by means of a torsion bar 33. When used as a load support, the feet 13 are omitted. A load plate, not represented, is disposed on the bars 31,32 and on the torsion bar 33. This load plate is suitably reinforced, at least along one of the sides not supported by the bars 31,32, e.g. by bending over a strip (corresponding to the edges 40 in FIG. 7). The adaptation to the uneven ground is obtained by torsion of the torsion bar 33.

The embodiment of a frame or a load support shown in FIG. 6 consists of four bars 34 connected by means of four gusset plates 35, e.g. by welding. The adaptation to an unevenness of the ground is obtained by bending of at least two of the four gusset plates 35. To achieve this bars 34 turn pairwise around one of the axes 36 or 37. If used as a load support, the feet 13 are omitted and a load plate (not drawn here) is elastically fixed to bars 34.

A load support seen from below is represented in FIG. 7, which consists of two identical triangular on edge beams 43. A load plate 44 made of sheet metal is fixed rigidly, e.g. by welding, on these beams 43. A strip 45 of the load plate 44, positioned between the two beams 43, acts as a bending link.

A variant of FIG. 7 is represented in FIG. 8, wherein the two beams 43 are connected by a pivot link 46. In this case the load plate 44 is preferably not connected rigidly, but somewhat elastically with the beams 43.

In the embodiments described above bending, torsional and twisting deformations are mentioned. It is understood that these deformations shall always remain within the limits of elasticity.

The described devices adapt automatically to unevennesses of the ground up to 30 mm for a side-length of 1 m.

We claim:

1. A mass and force meter comprising a four cornered frame with four sides, four legs each mounted under one corner of said frame, a four cornered load support with four sides resting upon said frame by means of four intermediary levers, each pair of opposite sides of the frame as well as the load support mounted for undergoing a relative angular displacement around an axis bisecting each pair of oppositely located sides under the effect of the weight of the meter itself, when the meter is positioned on an uneven surface, while two originally parallel and adjacent sides of the frame and the load support remain substantially parallel.

2. A mass and force meter comprising a four cornered frame consisting of four bars resistant to bending forming four sides and having two links in opposite corners, four legs each mounted under one corner of said frame, a four cornered load support with four sides resting upon said frame by means of four intermediary levers, each pair of opposite sides of the frame as well as the load support mounted for undergoing a relative angular displacement around an axis bisecting each pair of oppositely located sides under the effect of the weight of the meter itself, when the meter is positioned on an uneven surface, while two originally parallel and adjacent sides of the frame and the load support remain substantially parallel.

3. A mass and force meter comprising a frame consisting of two bars resistant to bending forming two sides connected by a torsion bar, four legs each mounted under each of the ends of said bars, a four cornered load support with four sides resting upon said frame by means of four intermediary levers, each pair of opposite sides of the frame as well as the load support mounted for undergoing a relative angular displacement around an axis bisecting each pair of oppositely located sides under the effect of the weight of the meter itself, when the meter is positioned on an uneven surface, while two originally parallel and adjacent sides of the frame and the load support remain substantially parallel.

4. A mass and force meter comprising a four cornered frame with four sides, four legs each mounted under a corner of said frame, a load support consisting of two bars resistant to bending forming two sides of the load support, a torsion bar connecting said two bars, a quadrangular load plate fixed to said bars, said support resting upon said frame by means of four intermediary levers, each pair of opposite sides of the frame as well as the load support mounted for undergoing a relative angular displacement around an axis bisecting each pair of oppositely located sides under the effect of the weight of the meter itself, when the meter is positioned on an uneven surface, while two originally parallel and adjacent sides of the frame and the load support remain substantially parallel.

5. A mass and force meter comprising a four cornered frame with four sides, four legs each mounted under a corner of said frame, a load support consisting of four interconnected torsion bars forming four sides of the load support, said load support resting upon said frame by means of four intermediary levers, each pair of opposite sides of the frame as well as the load support undergoing a relative angular displacement around an axis bisecting each pair of oppositely located sides under the effect of the weight of the meter itself, when the meter is positioned on an uneven surface, while two originally parallel and adjacent sides of the frame and the load support remain substantially parallel.

6. A mass and force meter comprising a four cornered frame with four sides, four legs each mounted under a corner of said frame, a load support consisting of two triangularly shaped plates connected to each other along a diagonal thus forming a four-sided surface, said load support resting upon said frame by means of four intermediary levers, each pair of opposite sides of the frame as well as the load support undergoing a relative angular displacement around an axis bisecting each pair of oppositely located sides under the effect of the weight of the meter itself, when the meter is positioned on an uneven surface, while two originally parallel and adjacent sides of the frame and the load support remain substantially parallel.

7. A mass and force meter comprising a four cornered frame with four sides, four legs each mounted under one corner of said frame, a four cornered load support with four sides resting upon said frame by means of four intermediary levers, each pair of opposite sides of the frame as well as the load support mounted for undergoing a relative angular displacement around an axis bisecting each pair of oppositely located sides under the effect of the weight of the meter itself, when the meter is positioned on an even surface, while two originally parallel and adjacent sides of the frame and the load support remain substantially parallel, and means to limit the relative angular displacement of said oppositely located pairs of sides.

8. A mass and force meter according to claim 7, in which said means to limit the relative angular displacement of said oppositely located pairs of sides comprises an arm fixed to one side of the frame and extending orthogonally to a diagonal axis of said frame, a bifurcated end at the free end of said arm, said bifurcated end loosely embracing another of said sides of the frame.

* * * * *